United States Patent Office 3,525,712
Patented Aug. 25, 1970

3,525,712
PROCESS FOR PREPARING THERMOPLASTIC
POLYCARBONATES
Morton Kramer, Pittsfield, Mass., assignor to General
Electric Company, a corporation of New York
No Drawing. Filed Sept. 1, 1965, Ser. No. 484,445
Int. Cl. C08g 17/13
U.S. Cl. 260—47                                         2 Claims

ABSTRACT OF THE DISCLOSURE

Thermoplastic randomly branched aromatic polycarbonates are prepared by adding to the reaction medium a difficulty soluble polyfunctional organic compound, such as 4,4'-bis(p-hydroxyphenyl) pentanoic acid, in finely divided form. The finely divided form may be attained by adding the polyfunctional organic compound as particles 50 weight percent thereof having a size less than 100 microns, as a solid solution consisting of polycarbonate having dissolved therein the polyfunctional organic compound, or as a solvent solution of the polyfunctional organic compound from which the latter precipitates in finely divided form.

This invention relates to a process for preparing a particular thermoplastic polycarbonate employing certain polyfunctional materials and to a novel composition used in the process.

Polycarbonates are well known, commercially available materials which have achieved wide acceptance in the plastics industry. Such polymers are prepared by reacting a carbonate precursor such as phosgene, for example, with a dihydric phenol such as 2,2-bis(4-hydroxyphenyl) propane, hereinafter referred to as "bisphenol-A," to provide a linear polymer consisting of dihydric phenol derived units bonded to one another through carbonate linkages. Generally speaking, such polymers offer a high resistance to mineral acids, have a high tensile strength and a dimensional stability and impact strength far surpassing that of any other thermoplastic material.

Thermoplastic randomly branched polycarbonates as disclosed in copending application Ser. No. 484,444, filed Sept. 1, 1965, possess definite and unique properties which allow their use in preparing articles not heretofore easily or readily produced with straight reaction products of a dihydric phenol and a carbonate precursor. The thermoplastic randomly branched polycarbonates are prepared by reacting a polyfunctional organic compound with a dihydric phenol and a carbonate precursor. However, in the process, certain polyfunctional organic compounds existing as solids at room temperature, are difficultly soluble in the reaction medium and thus do not readily enter into the reaction to produce the desired thermoplastic randomly branched polycarbonates. It has now been surprisingly discovered that this drawback can be overcome by employing the polyfunctional compound in finely divided form which results in producing the desired thermoplastic randomly branched polycarbonate.

Therefore, it is the object of this invention to provide a novel solid solution.

Another object of this invention is to provide a process for preparing a thermoplastic randomly branched polycarbonate composition.

These and other objects and advantages of this invention will become apparent from the following detailed description thereof.

Briefly, according to this invention, the novel composition herein is attained by dissolving a solid polyfunctional organic compound in a polycarbonate to form a single phase solid solution. The novel process of this invention involves preparing a thermoplastic randomly branched polycarbonate by adding to the reaction medium a difficultly soluble polyfunctional organic compound in finely divided form having a particular particle size distribution. The finely divided form may be attained by adding the novel composition of this invention to the reaction medium which results in the polyfunctional compound precipitating in finely divided form or by adding a solvent solution of the polyfunctional compound to the reaction medium which also results in the polyfunctional compound precipitating in finely divided form. The surprising discovery is that by employing the organic polyfunctional compound in finely divided form, it is readily utilized in the reaction to produce the desired thermoplastic randomly branched polycarbonate. If the polyfunctional organic compound is not in finely divided form, it does not enter into the reaction to produce the desired polycarbonate.

The following examples are set forth to illustrate more clearly the principle and practice of this invention to those skilled in the art. Unless otherwise specified where parts are mentioned, they are parts by weight. Also, as used herein, "particle size," expressed in microns, refers to that dimension which is the largest of any given particle.

EXAMPLE I 20.0 grams of technical grade diphenolic acid [hereinafter to mean 4,4-bis(p-hydroxyphenyl) pentanoic acid], 80% of which has a particle size greater than 500 microns, and 180.0 grams of a polycarbonate are placed in a one-half gallon jar and roll mixed for about one hour. The polycarbonate so employed herein is one prepared by the reaction of "bisphenol-A" and phosgene. This material is dried overnight at 125° in an air circulating oven. The mixture is then extruded at about 200° C. in a small laboratory extruder (Wayne). A clear, single phase strand is obtained through the die orifice of the extruder. The strand is then chopped into pellets of about ⅛" in length. The extruded material is then analyzed by potentiometric titration and is found to contain about 10% diphenolic acid by weight. The extruded material is a single phase solid solution consisting of diphenolic acid dissolved in the polycarbonate.

EXAMPLE II

To a 500 ml. flask, a total of 237 ml. of methylene chloride, 79 ml. of heptane, 0.6 gram of phenol and 0.036 gram of pyridine are added. The phenol and pyridine are added as dilute solutions in methylene chloride. While agitating, 2.32 grams of the pellets produced in Example I are added to the flask. The pellets dissolve in the methylene chloride reaction medium with the precipitation of diphenolic acid in the form of finely divided particles, 75% of which has a particle size of less than 50 microns. To the reaction medium is then added 50.0 grams of "bisphenol-A" and 57.1 grams of calcium hydroxide. Phosgene is then added at a rate of approximately 0.3 gram per minute while rapidly agitating. With the stoichiometric addition of phosgene, a drop in reflux temperature is noted in conjunction with an extreme rise in viscosity. The phosgene addition is continued for about five minutes. Dry air is then bubbled through the solution for a period of about 10 minutes. The reaction mixture is diluted with 500 ml. of methylene chloride and centrifuged in glass bottles for 30 minutes. The clear methylene chloride solution containing the polycarbonate dissolved therein is separated from the residue. The methylene chloride solution is slowly added to methanol in a Waring Blendor to precipitate the polycarbonate. The polycarbonate is then analyzed and shows that about 95% of the diphenolic acid is incorporated in the reaction product.

EXAMPLE III

Example III is repeated except that in place of the pellets prepared in Example I, a solid diphenolic acid ground to a particle size of which 80% is about 10 microns is employed herein.

The results obtained are essentially the same as in Example II.

EXAMPLE IV

Example II is repeated except that in place of the pellets prepared in Example I, the diphenolic acid is first dissolved in about 19 ml. of acetone. The solvent solution is then added to the reaction mixture. The diphenolic acid precipitates as finely divided particles about 60% of which have a particle size of less than about 50 microns.

The results, upon polymer analysis, are essentially the same as in Example II.

EXAMPLE V

Example III is repeated except that the diphenolic acid employed herein is one in which about 75% has a particle size greater than about 500 microns.

Upon analysis of the polymer, the results show that only about 6% of the diphenolic acid is incorporated in the reaction product. This example clearly shows the criticality of the particle size of the diphenolic acid.

This invention is directed to a novel composition and to a process for preparing thermoplastic randomly branched polycarbonate compositions in an organic solvent reaction medium by employing polyfunctional compounds which are solids at room temperature and which are difficultly soluble in the organic solvent reaction medium. The composition of this invention is a single phase solid solution consisting of a polycarbonate having dissolved therein a polyfunctional organic compound. The polyfunctional organic compound employed herein is one containing at least three functional groups, which groups may be either hydroxyl, carboxyl, thiol or amine or mixtures thereof. As used herein, "difficultly soluble" means that the particular material has a solubility of less than about 5 parts in 100 parts of the organic solvent reaction medium.

The novel composition of this invention, consisting of the single phase solid solution, may be prepared by merely mixing the two materials at a temperature which is above the softening temperature of the polycarbonate. Upon cooling to room temperature, the resulting solid is a single phase solid solution of the two materials. In the practice of this invention, it may not be necessary to be at a temperature above the melting or softening point of the polyfunctional compound. As a practical method of preparing the composition of this invention, the two materials can be fed into the hopper of a conventional screw extruder and extruded through a die orifice as a strand of the single phase solid solution of the composition. The temperature within the extruder barrel can be that temperature which causes the polycarbonate to become molten. Preferably, the temperature within the extruder barrel is about 150–400° C. The extruded strand can then be chopped into pellets. The amount of the polyfunctional organic compound dissolved in the polycarbonate can vary between 1 to 90 weight percent of the polyfunctional organic compound based on the total weight of the resulting solid solution. Preferably the amount employed is in the range of 20–60 weight percent thereof.

In addition, this invention is directed to a particular process for preparing thermoplastic randomly branched polycarbonates, when employing a polyfunctional which is a solid at room temperature and which is difficultly soluble in the organic solvent reaction medium. The critical feature of the instant process requires that the polyfunctional organic compound exists in the organic solvent reaction medium in finely divided form. The polyfunctional organic compound must be such that at least 50 weight percent and preferably 80 weight percent thereof has a particle size of less than about 100 microns. Having the polyfunctional organic compound present in finely divided form in the organic solvent reaction medium may be accomplished in several different ways. When adding the novel composition of this invention to the organic solvent reaction medium, the polyfunctional organic compound precipitates in finely divided form having the desired critical particle size. The novel composition of this invention may be conveniently added as pellets.

Alternatively, the polyfunctional organic compound can be first ground to the desired critical particle size and then added directly to the organic solvent reaction medium. Additionally, the polyfunctional organic compound can be first dissolved in an organic solvent and then added to the organic solvent reaction medium. The polyfunctional organic compound precipitates in finely divided form having the desired critical size. In this last embodiment, it is necessary that the solvent in which the polyfunctional organic compound is dissolved be one which is compatible with the organic solvent reaction medium. Obviously the solvent used is not the same as the organic solvent reaction medium since the organic solvent reaction medium must be one in which the polyfunctional organic compound is difficulty soluble. In addition, the amount of solvent employed must be such as to be insufficient to keep the polyfunctional organic compound in solution after addition thereof to the organic solvent reaction medium. By this, it is meant that the polyfunctional organic compound must precipitate in finely divided form in the reaction medium. Examples of the solvents which can be used in place of those in Example IV are dioxane, ethyl acetate, butyl acetate, methyl ethyl ketone, and pyridine. The preferred solvent to be employed herein is acetone.

As stated previously, the critical feature of the instant invention is that the polyfunctional organic compound must exist in the organic solvent reaction medium in a finely divided form having the critical particle size previously set forth.

In the practice of this invention, the process for preparing a thermoplastic randomly branched polycarbonate composition comprises reacting a dihydric phenol and a carbonate precursor in the presence of a polyfunctional organic compound. The dihydric phenol employed in the practice of this invention is any dihydric phenol in which the sole reactive groups are the two phenolic hydroxyl groups. One class of suitable dihydric phenols are those, for instance, falling within the scope of the formula:

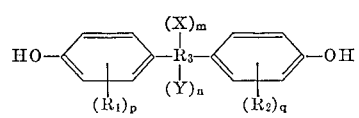

wherein $R_1$ and $R_2$ are independently selected from the group consisting of halogen, such as fluorine, chlorine and bromine, and alkyl radicals containing up to three carbon atoms, such as methyl, ethyl, propyl and isopropyl; $p$ and $q$ are whole numbers from 0 to 4; $R_3$ is selected from the group consisting of alkylidene radicals containing from 1 to 10 carbon atoms, such as methylidene, ethylidene, propylidene, butylidene, pentylidene, hexylidene, heptylidene, octylidene, nonylidene, and decylidene, and cycloaliphatic radicals containing from 5 to 8 carbon atoms in the cyclic ring, such as cyclopentylidene cyclohexylidene, cycloheptylidene and cyclooctylidene and X and Y are phenol; $m$ and $n$ may be the same or different and are whole numbers from 0 to 1. Examples of bisphenols falling within the scope of Formula I are:

1,1-bis(4-hydroxyphenyl) methane
1,1-bis(3-methyl-4-hydroxyphenyl)ethane
2,2-bis(4-hydroxyphenyl)propane
2,2-bis(3,5-difluoro-4-hydroxyphenyl)butane
3,3-bis(3,5-dibromo-4-hydroxyphenyl)pentane 3,3-bis(3-methyl-4-hydroxyphenyl)hexane
4,4-bis(4-hydroxyphenyl)heptane
2,2-bis(3-ethyl-4-hydroxyphenyl)octane
2,2-bis(3,5-isopropyl-4-hydroxyphenyl)nonane
2,2-bis(3,5-dibromo-4-hydroxyphenyl)nonane
2,2-bis(3-propyl-4-hydroxyphenyl)decane
1,1-bis(4-hydroxyphenyl)cyclopentane
1,1-bis(4-hydroxyphenyl)cyclohexane
1,1-bis(4-hydroxyphenyl)cycloheptane
1,1-bis(4-hydroxyphenyl)cyclooctane
1,1-bis(4-hydroxyphenyl)1,1-diphenyl methane
1,1-bis(4-hydroxyphenyl)-1-phenyl ethane Another class of dihydric phenols which may be used in the practice of the invention includes the dihydric phenol ethers conforming to the formula:

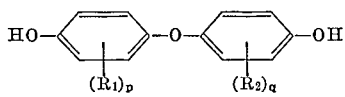

wherein $R_1$, $R_2$, $p$, and $q$ all have the meanings given above.

Examples of bisphenols falling within the scope of above formula are:

bis(4-hydroxyphenyl)ether
bis(3-methyl-4-hydroxyphenyl)ether
bis(3-ethyl-4-hydroxyphenyl)ether
bis(3,5-dichloro-4-hydroxyphenyl)ether
bis(3,5-dibromo-4-hydroxyphenyl)ether
bis(3-chloro-5-methyl-4-hydroxyphenyl)ether Still another class of dihydric phenols useful in the practice of the invention includes the dihydroxydiphenyls conforming to the formula:

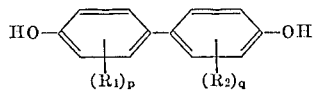

wherein $R_1$, $R_2$, $p$ and $q$ all have the meanings given above. Examples of bisphenols falling within the scope of above formula are:

p,p'-dihydroxydiphenyl
3,3'-dimethyl-4,4'-dihydroxydiphenyl
3,3'-diethyl-4,4'-dihydroxydiphenyl
3,3'-dichloro-4,4'-dihydroxydiphenyl
3,3'-5,5'-tetrabromo-4,4'-dihydroxydiphenyl Yet another class of dihydric phenols which may be used as the difunctional compounds in the practice of the invention includes the dihydroxaryl sulfones such as, for example, those conforming to the formula:

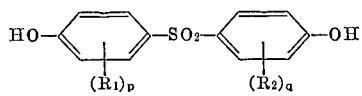

wherein $R_1$, $R_2$, $p$ and $q$ all have the meaning given above. Examples of bisphenols falling within the scope of above formula are:

bis(4-hydroxyphenyl)sulfone
bis(3-methyl-4-hydroxyphenyl)sulfone
bis(3,5-dimethyl-4-hydroxyphenyl)sulfone
bis(3,5-dibromo-4-hydroxyphenyl)sulfone
bis(3-chloro-4-hydroxyphenyl)sulfone
bis(3-methyl-5-ethyl-4-hydroxyphenyl)sulfone
bis(3,5-diisopropyl-4-hydroxyphenyl)sulfone A further class of dihydric phenols which may be used in the practice of the invention includes the dihydroxy benzenes, and the halo- and alkyl-substituted dihydroxy benzenes such as, for example, resorcinol, hydroquinone, 1,4-dihydroxy-2-chlorobenzene, 1,4-dihydroxy-2-bromobenzene, 1,4-dihydroxy-2,3-dichlorobenzene, 1,4-dihydroxy-2-methyl-benzene, 1,4-dihydroxy-2,3-dimethylbenzene, 1,4-dihydroxy-2-bromo-3-propylbenzene.

Still another class of dihydric phenols useful in the practice of the present invention include the dihydroxyl diphenyl sulfoxides, such as, for example, those conforming to the formula:

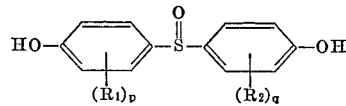

wherein $R_1$, $R_2$, $p$, and $q$ all have the meanings given above. Examples of bisphenols falling within the above formula are:

bis(4-hydroxyphenyl)sulfoxide
bis(3-methyl-4-hydroxyphenyl)sulfoxide
bis(3,5-dimethyl-4-hydroxyphenyl)sulfoxide
bis(3,5-dibromo-4-hydroxyphenyl)sulfoxide
bis(3-methyl-5-ethyl-4-hydroxyphenyl)sulfoxide
bis(3,5-diisopropyl-4-hydroxyphenyl)sulfoxide It is, of course, possible to employ a mixture of two or more different dihydric phenols in preparing the aromatic thermoplastic carbonate polymers of the invention.

The carbonate precursor employed in the process of this invention, to prepare the thermoplastic randomly branched polycarbonates, is one selected from the group consisting of carbonyl halides and haloformates, and mixtures thereof. The carbonyl halides employed herein can be carbonyl bromide, carbonyl chloride, carbonyl fluoride, etc. and mixtures thereof. The preferred carbonyl halide to be employed herein is carbonyl chloride.

The haloformates which can be employed herein in the practice of this invention to prepare the thermoplastic randomly branched polycarbonate compositions include bishaloformates of dihydric phenols (bischloroformates of hydroquinone, bis-phenol A, etc.) or glycols (bis-haloformates of ethylene glycol, neopentyl glycol, polyethylene glycol, etc.) and mixtures thereof or mixtures with a carbonyl halide.

The polyfunctional organic compound employed in the practice of this invention is any polyfunctional compound which is a solid at room temperature and which is difficultly soluble in the organic solvent reaction medium used to prepare the thermoplastic randomly branched polycarbonates. In addition, the polyfunctional organic compound employed herein contains at least three functional groups and preferably 3–20 functional groups. The functional groups may be either hydroxyl, carboxyl, thiol or an amine or mixtures thereof. It must be emphasized, however, that when using a polyfunctional organic compound having the following configuration

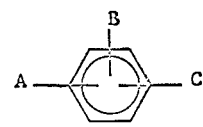

wherein A, B and C may be either hydroxyl, carboxyl, thiol or amine groups or mixtures thereof, the groups must be other than ortho relative to each other except when one of the ortho pair is a carboxyl group. Typical of some of the polyfunctional organic compounds which can be employed in the practice of this invention and which can be employed in place of those used in the examples are:

phloroglucinol
2,4-dihydroxy-benzoic acid
trimesic acid
4,4-bis(3-isopropyl-4-carboxyphenyl)hexanol
3,5-dihydroxythiophenol
melamine, and
triethanolamine Preferably, the polyfunctional organic compound to be employed herein is diphenolic acid.

Additionally, it is within the scope of the invention to add a difunctional carboxylic acid to the polycarbonate producing reaction between the dihydric phenol (or mixture of two or more different dihydric phenols), the carbonyl halide, and the polyfunctional reactant. In general, any difunctional carboxylic acid conventionally used in the preparation of linear polyesters may be employed to prepare the aromatic thermoplastic carbonate polymers of the invention. Examples of carboxylic acids which are useful are aliphatic carboxylic acids, aliphatic-aromatic carboxylic acids, or aromatic carboxylic acids. Such acids will generally conform to the formula

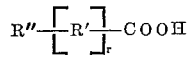

in which R′ is an alkylene or alkylidene group such as methylene, ethylene, propylene, ethylidene, propylidene, isopropylidene, butylene, butylidene, isobutylidene, amylene, isomylene, amylidene, isoamylidene, etc., a cycloaliphatic group such as, for example, cyclopentyl, cyclohexyl, cycloheptyl, cyclooctyl, etc.; an alkylene, alkylidene, or cycloaliphatic group containing ethylenic unsaturation; an aromatic radical such as phenylene, naphthylene, biphenylene, substituted phenylene, etc.; an aralkyl radical such as tolylene, xylene, etc., R″ is either a carboxyl or a hydroxyl group; $r$ is one (1) when R″ is a hydroxyl group, and is either zero (0) or one (1) when R″ is a carboxyl group. Thus, the dicarboxylic acid will either be a monohydroxy monocarboxylic acid or a dicarboxylic acid.

Included within the scope of this invention are the saturated, aliphatic dibasic acids derived from straight chain paraffin hydrocarbons, such as oxalic, malonic, dimethyl malonic, succinic, glutaric, adipic, pimelic, suberic, azelaic, and sebacic acid. Also included are the halogen substituted aliphatic dibasic acids. Aliphatic carboxylic acids containing hetero atoms in their aliphatic chain, such as thio-diglycollic or diglycollic acid may also be used. Also useful are such unsaturated acids as maleic or fumaric.

Suitable examples of aromatic and aliphatic-aromatic dicarboxylic acids which may be used are phthalic, isophthalic, terephthalic, homophthalic, o-, m- and p-phenylenediacetic acid; the polynuclear aromatic acids such as diphenic acid, and 1,4-naphthalic acid.

Examples of hydroxy acids are the aliphatic hydroxy acids such as hydroxybutyric acid, glycollic acid, and lactic acid. The hydroxy-substituted long-chain fatty acids, such as 12-hydroxystearic acid may also be used. Cycloaliphatic acids including tetrahydrophthalic, tetrahydroterephthalic, tetrahydroisophthalic, 3,6-endomethylenetetrahydrophthalic acid (also known as Carbic or Nadic acid), hexachloro-3,6-endomethylenetetrahydrophthalic acid (also known as Chlorendic acid) or camphoric acid may also be used. Mixtures of two or more different difunctional carboxylic acids may also be employed, and where carboxylic acid is mentioned herein, mixtures of such materials are considered to be included.

Further examples of difunctional carboxylic acids useful in the practice of the invention may be found in U.S. Pat. No. 3,169,121—Goldberg assigned to the assignee of the present invention, which, by reference, is hereby made part of the disclosure and teaching of the present application.

The amount of difunctional carboxylic acid which may be added to the polycarbonate forming reaction between the dihydric phenol, the polyfunctional organic compound and the carbonate precursor may vary within wide limits, depending upon the amount of dihydric phenol and polyfunctional reactant charged to the reaction mixture, the sole limitation being that in the final polycarbonate produced, the molar amount of the polyfunctional reactant (or molar units derived from the trifunctional reactant) equals from about 0.1 to about 2 percent of the total moles of dihydric phenol, difunctional carboxylic acid, and polyfunctional reactant in the polymer.

In the practice of this invention, the process employed is one in which an inorganic acid acceptor is employed which acid acceptor is difficultly soluble in the organic solvent reaction medium. The process comprises passing a carbonate precursor into an organic solvent reaction medium slurry of the dihydric phenol and inorganic compound. The organic solvent reaction medium, as stated previously, is one in which the polyfunctional organic compound and inorganic acid acceptors are difficultly soluble and can be for example, methylene chloride, 1,2-dichloroethane, chlorobenzene, etc. The inorganic acid acceptor employed in this process can be an alkali or alkaline earth metal hydroxide, carbonate, bicarbonate or phosphate and is preferably calcium hydroxide. The amount of inorganic acid acceptor employed herein can vary from 2–8 moles per mol of dihydric phenol charged to the organic solvent reaction mixture, depending upon the conditions of reaction, the employment of polymerization catalysts, etc. In addition, two or more inorganic acid acceptors may be employed.

In the practice of the process of this invention, polymerization catalysts may also be added if desired. Suitable catalysts that can be employed herein are tertiary amines such as, triethyl amine; tripropyl amine; N,N-dimethyl aniline; quaternary ammonium compounds, such as, for example, tetraethylammonium bromide; cetyl triethylammonium bromide; tetra-n-heptylammonium iodide; tetra-n-propylammonium bromide; tetramethylammonium chloride; tetramethylammonium hydroxide; tetra-n-butylammonium iodide; benzyl trimethylammonium chloride; and quaternary phosphonium compounds, such as, for example, n-butyl triphenyl phosphonium bromide, and methyl triphenyl phosphonium bromide. The amount of catalyst used may range from none up to about 4% based upon the moles of dihydric phenol initially charged to the reaction.

Also, molecular weight regulators may be added, as for example, monofunctional phenols, i.e., phenol, p-tertiary butyl phenol; monofunctional organic acids, i.e., benzoic acid; and monofunctional alcohols, i.e., methanol, ethanol; in amounts of up to 2% based upon the weight of the dihydric phenol originally charged to the reaction mixture.

The reaction time may vary from a few minutes to a few hours, depending upon the particular polymer prepared, the degree of polymerization desired, and the choice of other reaction conditions. The temperatures at which the reaction may be consummated may also vary widely depending upon the particular process employed and the type of carbonate precursor used.

The advantages of this invention are found in the use of the novel composition described herein in preparing thermoplastic randomly branched polycarbonates by providing the polyfunctional organic compound in finely divided form in the reaction medium. In addition, the practice of the process of this invention allows the use of difficulty soluble polyfunctional organic compounds to be employed in preparing thermoplastic randomly branched polycarbonates.

It will thus be seen that the objects set forth above, among those made apparent from the preceding description, are efficiently attained, and since certain changes may be made in carrying out the above process and the composition set forth without departing from the scope of the invention, it is intended that all matters contained in the above description shall be interpreted as illustrative and not in a limiting sense.

What is claimed is:
1. A single phase solid solution consisting of an aromatic polycarbonate having dissolved therein 1–90 weight percent based on the total weight of the resulting solid solution of 4,4-bis(p-hydroxyphenyl) pentonic acid.

2. A process for preparing a thermoplastic randomly branched aromatic polycarbonate composition which process comprises reacting in an organic solvent reaction medium a dihydric phenol and a carbonate precursor in the presence of 0.1 to about 2 mole percent based on the total moles of reactants of finely divided 4,4-bis(p-hydroxyphenyl) pentanoic acid 50 weight percent of which has a particle size of less than 100 microns and wherein the organic solvent reaction medium has suspended therein an inorganic acid acceptor, said inorganic acid acceptor being selected from the group consisting of alkali and alkaline earth metal hydroxides, carbonates, bicarbonates and phosphates, and mixtures thereof and said carbonate precursor being selected from the group consisting of carbonyl halides and haloformates, and mixtures thereof.

References Cited

UNITED STATES PATENTS

| | | | |
|---|---|---|---|
| 2,950,266 | 8/1960 | Goldblum | 260—47 |
| 3,043,800 | 7/1962 | Schnell et al. | 260—47 |
| 3,094,508 | 6/1963 | Butterworth et al. | 260—47 |
| 3,132,118 | 5/1964 | Butterworth et al. | 260—47 |
| 3,220,973 | 11/1965 | Goldberg | 260—47 |
| 3,277,029 | 10/1966 | Chadwick et al. | 260—47 |
| 3,290,409 | 12/1966 | Munro | 260—47 |
| 3,291,774 | 12/1966 | Bolgiano | 260—47 |
| 3,254,047 | 5/1966 | Caldwell et al. | 260—33.2 |
| 3,379,790 | 4/1968 | Krauss et al. | 260—824 |
| 3,386,935 | 6/1968 | Jackson et al. | 260—47 |

OTHER REFERENCES

Krauss et al.: German application No. 1,136,490, printed Sept. 13, 1962.

SAMUEL H. BLECH, Primary Examiner

U.S. Cl. X.R.

260—49, 32.2